US012500431B2

(12) United States Patent
Matsuura

(10) Patent No.: US 12,500,431 B2
(45) Date of Patent: Dec. 16, 2025

(54) BATTERY STAND OUTPUTTING ELECTRIC POWER

(71) Applicant: Hitachi-LG Data Storage, Inc., Tokyo (JP)

(72) Inventor: Naoya Matsuura, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 657 days.

(21) Appl. No.: 17/948,487

(22) Filed: Sep. 20, 2022

(65) Prior Publication Data

US 2023/0231394 A1 Jul. 20, 2023

(30) Foreign Application Priority Data

Jan. 20, 2022 (JP) ................................. 2022-007503

(51) Int. Cl.
*H01M 10/46* (2006.01)
*H02J 7/00* (2006.01)

(52) U.S. Cl.
CPC .......... *H02J 7/0045* (2013.01); *H02J 7/0063* (2013.01); *H02J 2207/20* (2020.01)

(58) Field of Classification Search
CPC ...... H02J 7/0045; H02J 7/0063; H02J 7/0042; H01M 10/44; H01M 50/24; H01M 50/296

USPC ................................. 320/103, 114, 115, 116
See application file for complete search history.

(56) References Cited

U.S. PATENT DOCUMENTS

| | | | |
|---|---|---|---|
| 4,641,077 A * | 2/1987 | Pascaloff | H01M 10/42 320/113 |
| 9,381,058 B2 * | 7/2016 | Houser | A61B 90/08 |
| 2020/0156509 A1 | 5/2020 | Yamamoto et al. | |

FOREIGN PATENT DOCUMENTS

| | | | | |
|---|---|---|---|---|
| CN | 107872967 A | * | 4/2018 | ......... H02J 7/00036 |
| JP | 2019-6170 A | | 1/2019 | |
| WO | WO-2019130881 A1 | * | 7/2019 | ......... H01M 50/202 |

* cited by examiner

*Primary Examiner* — Edward Tso
(74) *Attorney, Agent, or Firm* — MATTINGLY & MALUR, PC

(57) ABSTRACT

A battery stand is configured to output an electric power stored in a battery to the outside when the battery is placed on a mounting part. A slit hole is formed on the top surface of the battery stand through which a slider is inserted and through which a movement range of the slider is regulated. The battery stand is linked to the movement of the slider and is equipped with a holding mechanism to secure the battery. The battery stand is equipped with a shielding member that shields the slit hole. The shielding member is attached to the slider and moves with the slider while maintaining the slit hole shielded.

13 Claims, 19 Drawing Sheets

BATTERY STAND OUTPUTTING ELECTRIC POWER

CROSS-REFERENCE TO RELATED APPLICATION

The present application claims priority from Japanese application JP2022-007503, filed on Jan. 20, 2022, the contents of which is hereby incorporated by reference into this application.

BACKGROUND OF THE INVENTION

1. Field of the Invention

The present invention relates to a battery stand.

2. Description of the Related Art

Japanese Patent Application Laid-Open No. 2019-6170 discloses a technique for preventing a foreign matter from entering a rail. In recent years, a charger with built-in rechargeable batteries, such as a portable mobile batteries (sometimes also referred to as a "battery"), have come to be widely used as the charger for the electronic device.

The inventors are considering a battery stand on which the battery is placed and configured to "output an electric power stored in the battery to other devices (outside)" and/or "charge the battery with the electric power input from outside. The battery stand is equipped with a holding mechanism for securing (holding) the battery. The battery stand is also equipped with a slider for operating the holding mechanism. The upper surface of the battery stand is formed with a slit hole through which the slider is inserted and which regulates the movement range of the slider. If the foreign matter (e.g., dust, dirt, etc.) enters the battery stand through the slit hole, it may adversely affect the function of the battery stand. Therefore, it is necessary to prevent the foreign matter from entering the battery stand through the slit hole.

SUMMARY OF THE INVENTION

The present invention has been made in order to cope with the above problems. That is, an object of the present invention is to provide a battery stand that can prevent a foreign matter from entering an interior of the battery stand.

In order to solve the above-mentioned problems,
the present disclosed battery stand is capable of outputting an electric power stored in a battery when the battery is placed on the battery stand.
The battery stand comprises:
a mounting part on which the battery is mounted;
a conductive part that is provided on the mounting part and is electrically connectable to a battery terminal part of the battery;
an output part that outputs the electric power input from the battery to the outside via the conductive part;
a slider that moves between a first position and a second position;
a holding mechanism that:
  interlocks with movement of the slider and secures, when the slider is positioned at the second position, the battery placed on the mounting part in a state where the battery terminal part is connected to the conductive part; and
  releases fixation of the battery when the slider is positioned at the first position;
a top surface having a slit hole through which the slider is inserted and which regulates a range of the movement of the slider; and
a shielding member that shields the slit hole,
wherein,
the shielding member is attached to the slider and moves with the movement of the slider while maintaining the slit hole shielded.

The disclosed battery stand is capable of charging a battery when the battery is placed on the battery stand.
The battery stand comprises:
a mounting part on which the battery is mounted;
a conductive part that is provided on the mounting part and is electrically connectable to a battery terminal part of the battery;
an input part that inputs an electric power input to the battery from the outside via the conductive part;
a slider that moves between a first position and a second position;
a holding mechanism that:
  interlocks with movement of the slider and secures, when the slider is positioned at the second position, the battery placed on the mounting part in a state where the battery terminal part is connected to the conductive part; and
  releases fixation of the battery when the slider is positioned at the first position;
a top surface having a slit hole through which the slider is inserted and which regulates a range of the movement of the slider; and
a shielding member that shields the slit hole,
wherein,
the shielding member is attached to the slider and moves with the movement of the slider while maintaining the slit hole shielded.

The battery stand is capable of outputting an electric power stored in a battery and charging the battery when the battery is placed on the battery stand.
The battery stand comprises:
a mounting part on which the battery is mounted;
a conductive part that is provided on the mounting part and is electrically connectable to a battery terminal part of the battery;
an output part that outputs the electric power input from the battery to the outside via the conductive part;
an input part that inputs the electric power input to the battery from the outside via the conductive part;
a slider that moves between a first position and a second position;
a holding mechanism that:
  interlocks with movement of the slider and secures, when the slider is positioned at the second position, the battery placed on the mounting part in a state where the battery terminal part is connected to the conductive part; and
  releases fixation of the battery when the slider is positioned at the first position;
a top surface having a slit hole through which the slider is inserted and which regulates a range of the movement of the slider; and
a shielding member that shields the slit hole,
wherein,
the shielding member is attached to the slider and moves with the movement of the slider while maintaining the slit hole shielded.

According to the present invention, the present invention can prevent a foreign matter from entering an interior of the battery stand.

DETAILED DESCRIPTION OF THE PREFERRED EMBODIMENTS

Embodiment

<Configuration>

Figure 1:
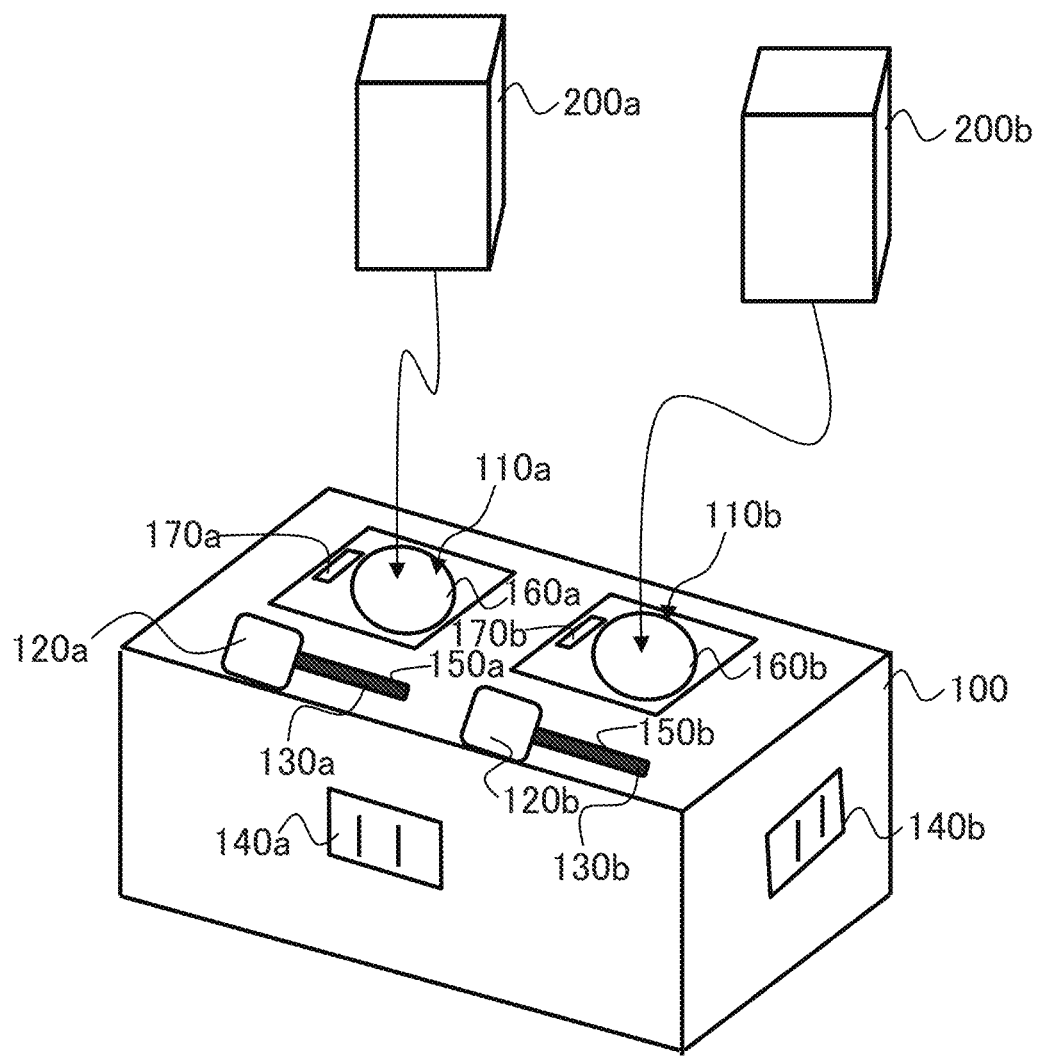
FIG. 1 is a perspective view showing a configuration example of a battery stand according to an embodiment of the present invention and a first battery and a second battery to be fixed to a battery stand.
Figure 2:
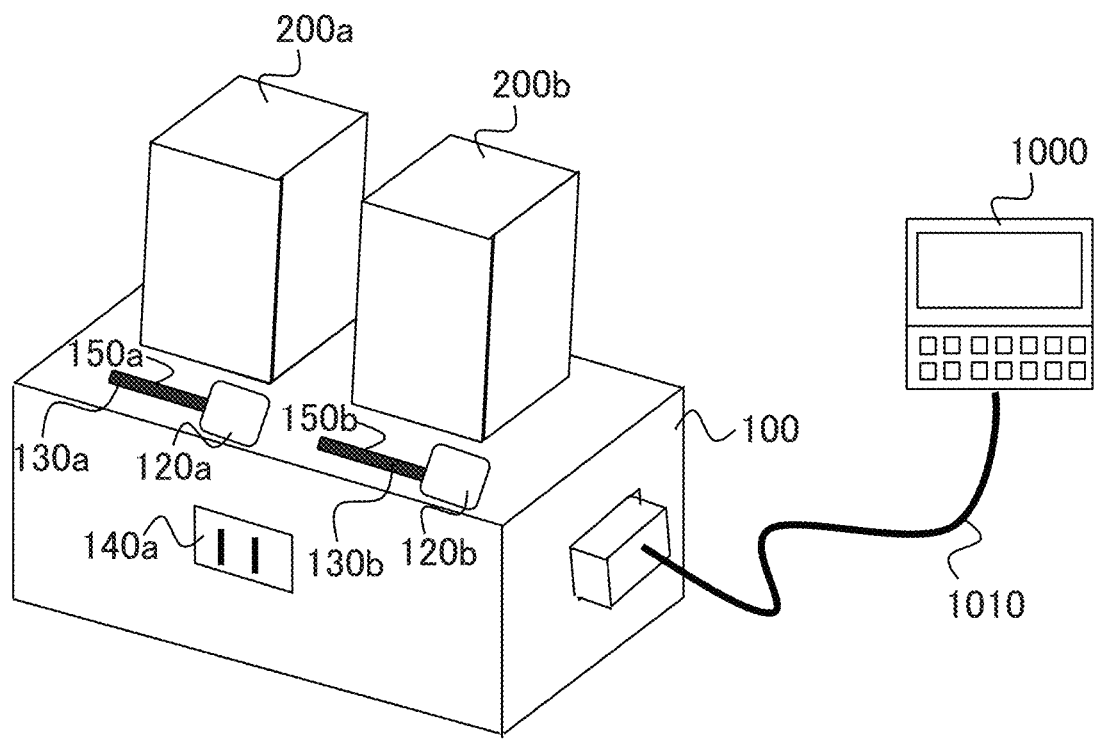
FIG. 2 is a perspective view showing a configuration example of the battery stand according to the embodiment of the present invention and the first battery and the second battery that have been fixed to the battery stand.

Hereinafter, an embodiment of the present invention will be described with reference to the diagrams. FIG. 1 is a perspective view showing a configuration example of a battery stand 100 according to the embodiment of the present invention and a first battery 200a and a second battery 200b to be fixed to the battery stand 100. FIG. 2 is a perspective view showing a configuration example of the battery stand 100 according to the embodiment of the present invention and the second battery 200b that have been fixed to the battery stand 100. Note that the first battery 200a and the second battery 200b are referred to as the "battery 200" when there is no need to distinguish between them.

The battery stand 100 is used together with the battery 200, and functions as a power supply device capable of outputting (supplying) an electric power stored in the battery 200 to an electronic device 1000 when the battery 200 is placed.

As shown in FIG. 1, the battery stand 100 has a rectangular parallelepiped shape including upper and lower surfaces and four side surfaces. The battery stand 100 is composed of a first battery mounting part 110a, a second battery mounting part 110b, a first slider 120a, a second slider 120b, a first shielding member 130a, a second shielding member 130b, a first outlet 140a, and a second outlet 140b. A first slit hole 150a and a second slit hole 150b, which are elongated holes, are formed in the top surface of the battery stand 100.

The first battery mounting part 110a and the second battery mounting part 110b are located on the top surface of the battery stand 100. The first battery mounting part 110a includes the first holding mechanism 160a (a part of the first holding mechanism 160a) and a first terminal 170a. The second battery mounting part 110b includes the second holding mechanism 160b (a part of the second holding mechanism 160b) and the second terminal 170b. The first outlet 140a is located/provided on one side of the battery stand 100. The second outlet 140b is located/provided on a side adjacent to the above one side of the battery stand 100.

Hereafter, each of the first battery mounting part 110a and the second battery mounting part 110b is referred to as a "battery mounting part 110" when there is no need to distinguish between them. Each of the first slider 120a and the second slider 120b is referred to as a "slider 120" when there is no need to specifically distinguish between them. Each of the first shielding part 130a and the second shielding part 130b is referred to as a "shielding member 130" when there is no need to specifically distinguish between them. Each of the first outlet 140a and the second outlet 140b is referred to as an "outlet 140" when there is no need to specifically distinguish between them. The outlet 140 may also be referred to as an "output part" for convenience. Each of the first slit hole 150a and the second slit hole 150b is referred to as a "slit hole 150" when there is no need to specifically distinguish between them. Each of the first holding mechanism 160a and the second holding mechanism 160b is referred to as a "holding mechanism 160" when there is no need to specifically distinguish between them. Each of the first terminal 170a and the second terminal 170b is referred to as a "terminal 170" when there is no need to specifically distinguish between them. The terminal 170 may also be referred to as a "conductive part" for convenience.

As shown in FIG. 2, the battery 200 is placed on the battery mounting part 110. The battery 200 is a built-in rechargeable battery charger. Although not shown in the figure, the battery 200 contains secondary battery (multiple secondary batteries) and a circuit including a control circuit that controls charging and discharging of the secondary batteries, a terminal for inputting the electric power from an external source to charge the secondary batteries, and a terminal for outputting the electric power stored in the secondary batteries to an external source. The battery 200 is fixed (held) to the battery stand 100 by the holding mechanism 160.

Figure 3:
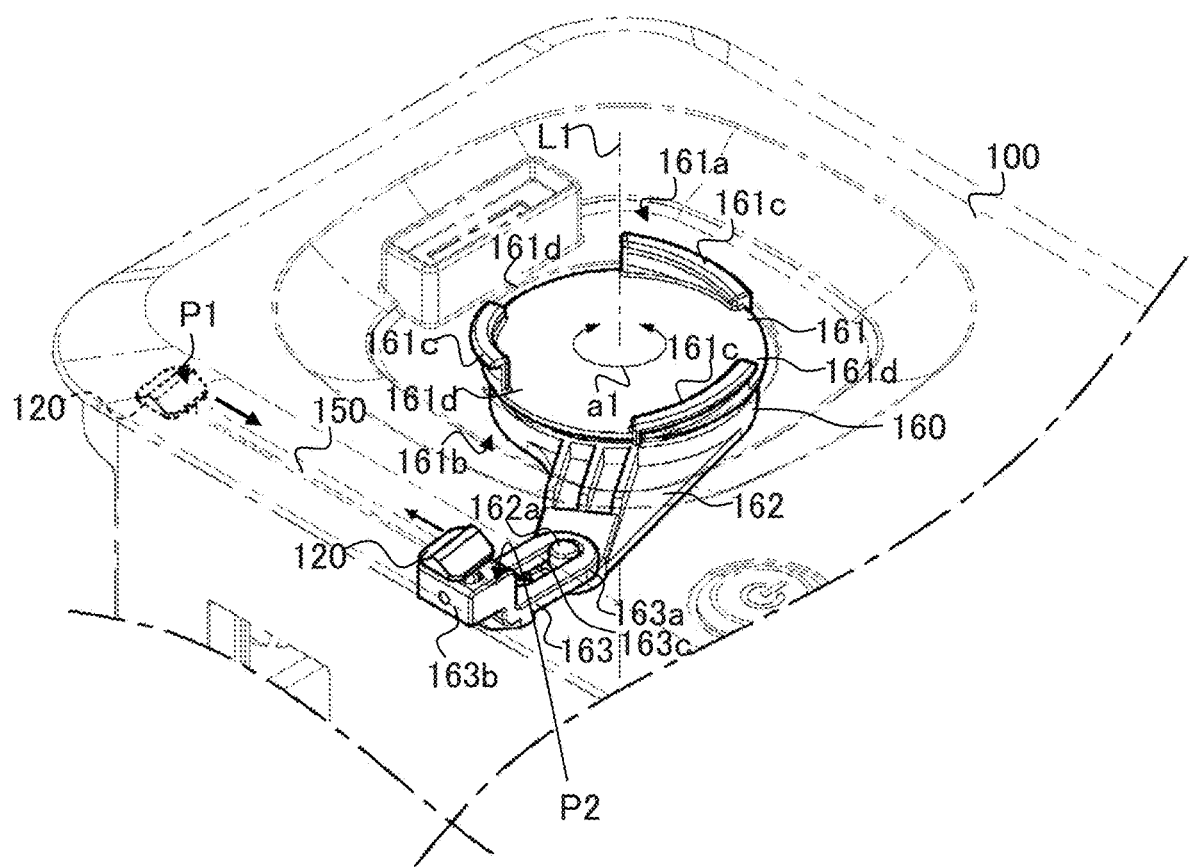
FIG. 3 shows an example configuration of a holding mechanism.

FIG. 3 shows an example configuration of the holding mechanism 160. As shown in FIG. 3, the holding mechanism 160 includes a holding part 161, a lever part 162, and a bridge part 163. It should be noted that the shielding member 130 is omitted in FIG. 3.

The holding part 161 has a circular planar shape. An upper part 161a that is a part of the holding part 161 is positioned on the outside of the battery stand 100, and a lower part 161b of the holding part 161 that is a part of the holding part 161 below the upper part 161a is positioned on the inside of the battery stand 100. The holding part 161 can rotate clockwise and counterclockwise as indicated by an arrow a1 about an imaginary line L1 indicated by a dashed dotted line as a rotation axis.

The upper part 161a of the holding part 161 has three engagement parts 161c formed on the outer peripheral edge of the holding part 161 with an interval 161d. The lever part 162 extends from the lower part 161b of the holding part 161 to the side of the lower part 161b, and is positioned in the inside of the battery stand 100. A guide protrusion 162a is provided at the end of the lever part 162.

The bridge part 163 is a member that connects the slider 120 and the lever part 162, and converts the linear movement of the slider 120 into the rotational movement of the lever part 162 and the holding part 161. The bridge part 163 is arranged inside the battery stand 100. The bridge part 163 includes a flat part 163a that is flat and a pedestal-shaped connection part 163b. In the flat part 163a of the bridge part 163, a cam path 163c, which is an elongated hole penetrating the flat part 163a in the thickness direction, is formed along the longitudinal direction that is the direction from one end on the lever part 162 side to the other end. In the cam path 163c, the guide protrusion 162a of the lever portion 162 is inserted (freely) into the cam path 163c. A connection part 163b that is pedestal-shaped is protruded at the other end of the flat part 163a.

Figure 4:
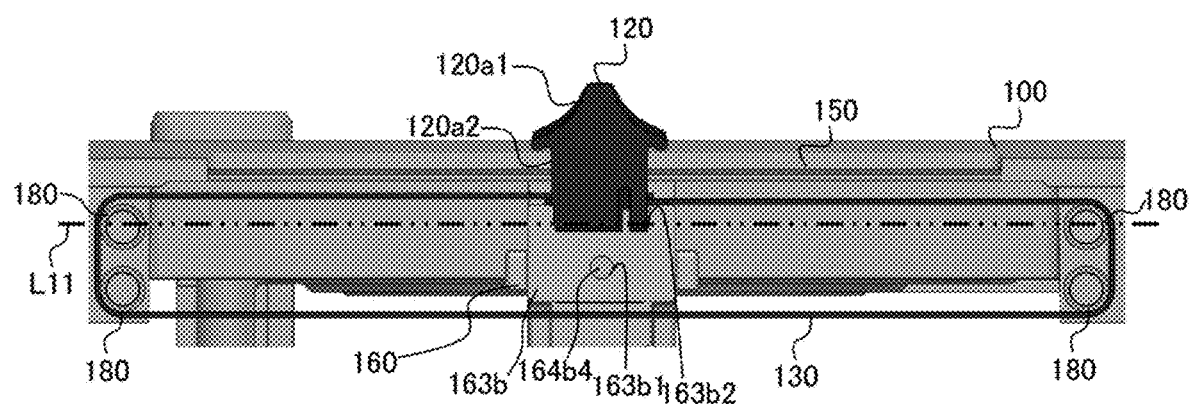
FIG. 4 illustrates an example configuration of a slider, a connection part, and a shielding member.

As shown in FIG. 4, the slider 120 is connected to the connection part 163b. Specifically, a concave part 163b2 (fitting part), which is a space into which a plate-shaped part 120a2 of the slider 120 can be inserted (fitted), is formed on the top surface of the connection part 163b. The concave part 163b2 is connected to an insertion hole 163b1 formed on the side surface of the connection part 163b. The plate-shaped part 120a2 of the slider 120 has a hole 120b1 (see FIG. 7) formed on the side surface of the plate-shaped part 120a2, which penetrates the plate-shaped part 120a2 in the direction of thickness of the plate-shaped part 120a2 (see FIG. 7). A pin 164b4 is inserted through the insertion hole 163b1 and the hole 120b1 while the plate-shaped part 120a2 of the slider 120 is in (fitted into) the concave part 163b2. As a result, the slider 120 is connected to the connection part 163b of the holding mechanism 160. The slider 120 is a knob member that can be moved within the slit hole 150 (within the range of the slit hole 150) to operate the holding mechanism 160. Furthermore, the slider 120 passes through the slit hole 150 and is attached to the shielding member 130 that is positioned inside the battery stand 100. The movement range of the slider 120 is restricted within the range of the slit hole 150 by the slit hole 150.

Figure 5:
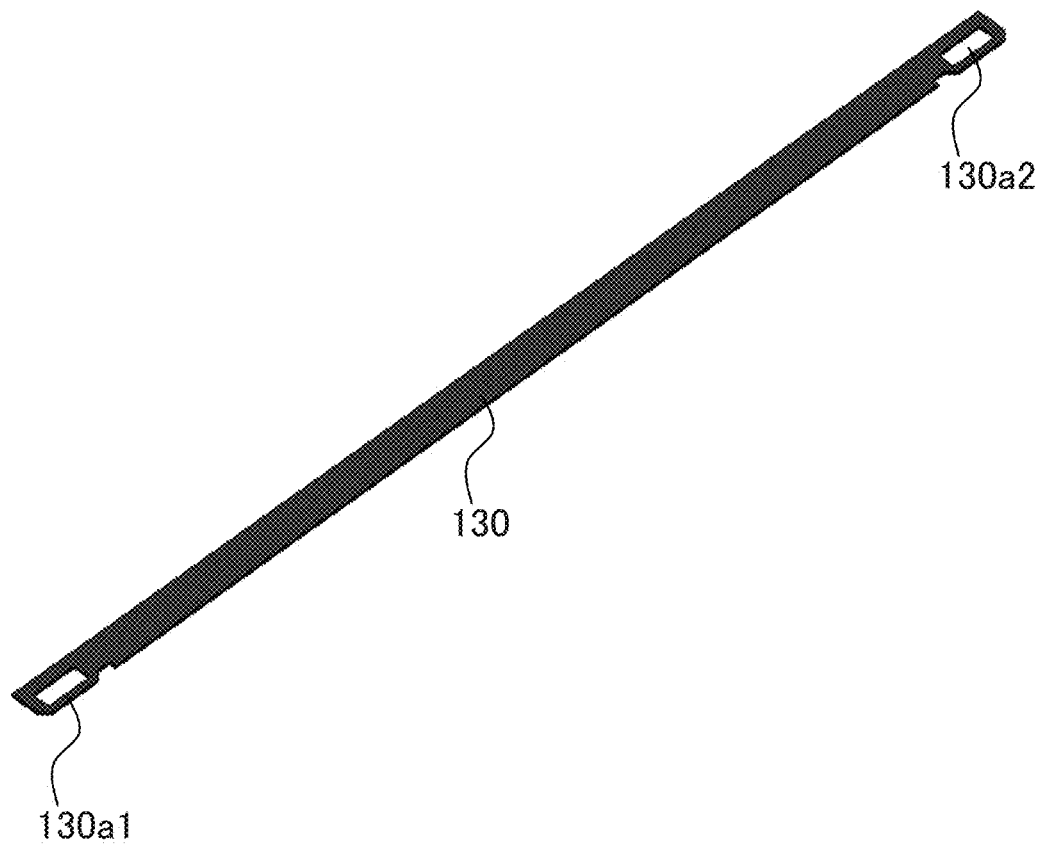
FIG. 5 illustrates an example of the shielding member.
Figure 6:
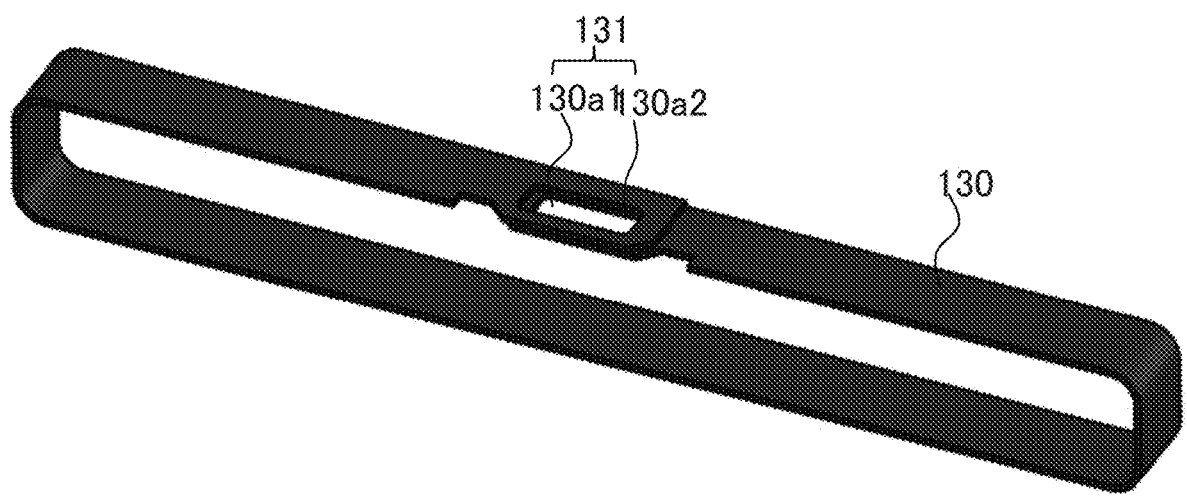
FIG. 6 illustrates an example of the shielding member.

As shown in FIG. 5, the shielding member 130 is a strip-shaped member, a first hole 130a1 is formed at one end of the shielding member 130 and a second hole 130b is formed at the other end of the shielding member 130. As shown in FIG. 6, the shielding member 130 forms one mounting hole 131 by overlapping the first hole 130a1 and the second hole 130a2, and is bent into a ring shape. That shielding member 130 is preferable because it is easy to manufacture. From the viewpoint of easily shielding the slit hole 150, the shielding member 130 that is annular preferably has a maximum diameter along the longitudinal direction of the slit hole 150 equal to or greater than the length of the slit hole 150 in the longitudinal direction.

Figure 7:
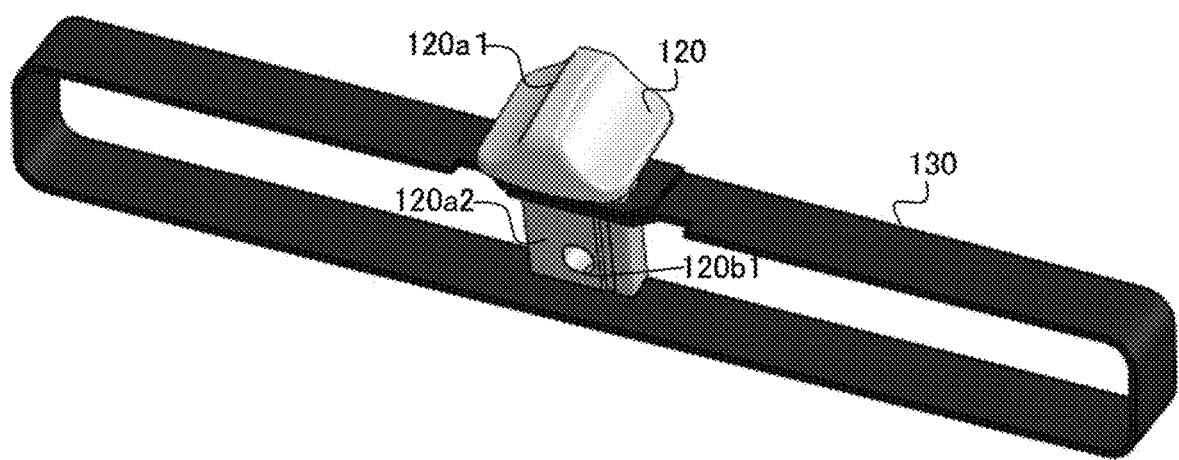
FIG. 7 illustrates an example of the shielding member.

As shown in FIG. 7, the slider 120 includes a slider body 120a1 and the plate-shaped part 120a2 extending downward from the lower surface of the slider body 120a1. The plate-shaped part 120a2 includes a hole 120b1 through which the pin 164b4 described above is inserted. The plate-shaped part 120a2 of the slider 120 is inserted into the mounting hole 131, and thereby, the slider 120 is attached to the shielding member 130.

Referring again to FIG. 4, four rotating bodies 180 are arranged inside the battery stand 100. The rotating bodies 180 are, for example, pulley members that are rotatably supported (is pivoted) by a shaft provided inside the battery stand 100 and have grooves on which the shielding member 130 is hung. Two rotating bodies 180 out of the four rotating bodies 180 are positioned below the top surface of the battery stand 100 and on a straight line (an imaginary line L11) parallel to the longitudinal direction of the slit hole 150 and are arranged at the positions outside each of one end and the other end in the longitudinal direction. The other two rotating bodies 180 are located directly below each of the above two rotating bodies 180.

Figure 8A:
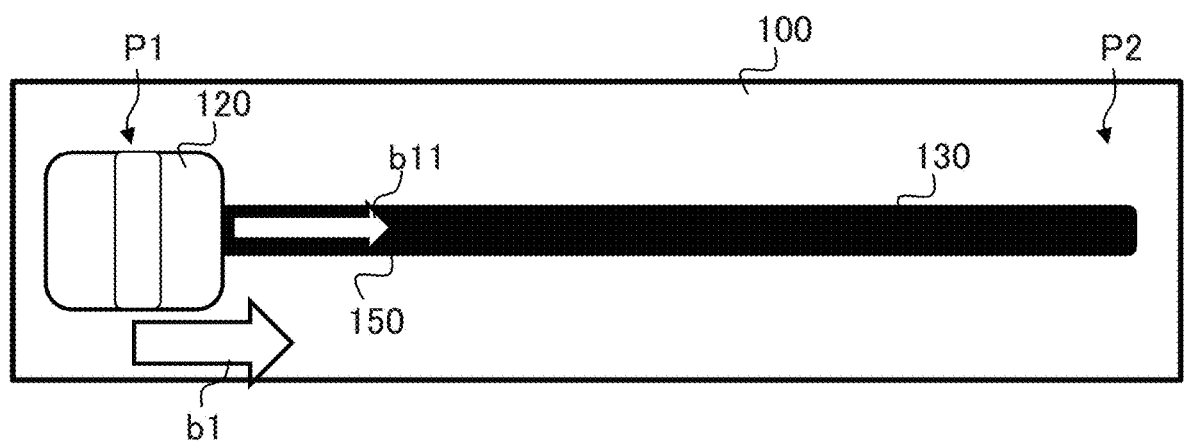
FIG. 8A illustrates the operation of the slider and the shielding member.
Figure 8B:
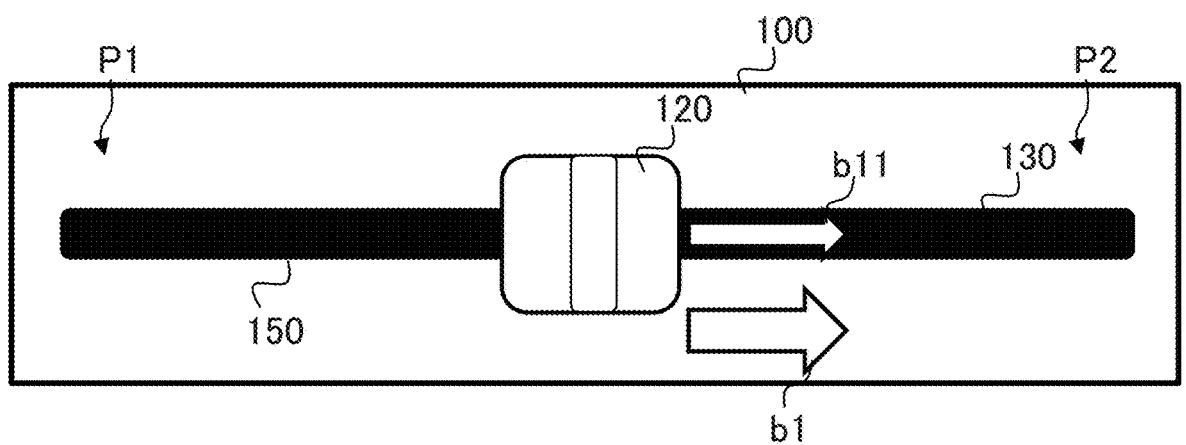
FIG. 8B illustrates the operation of the slider and the shielding member.
Figure 8C:
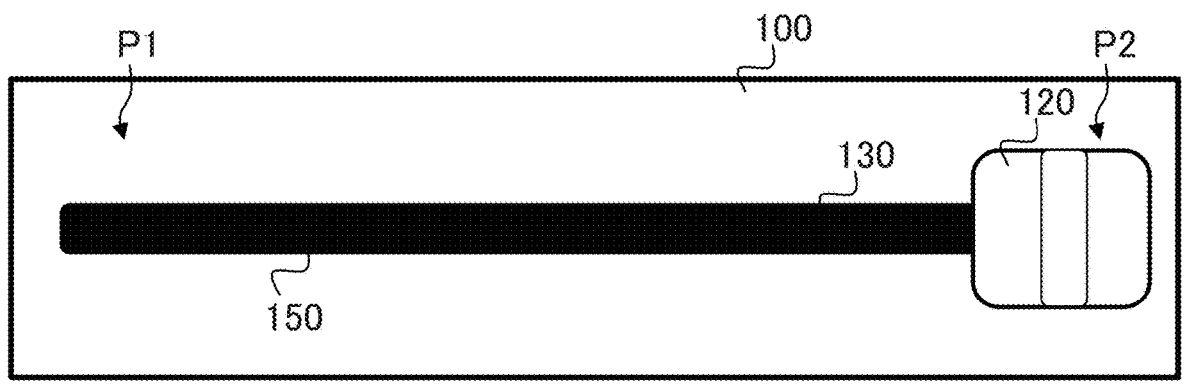
FIG. 8C illustrates the operation of the slider and the shielding member.

The shielding member 130 has a width larger than the width of the slit hole 150, and is stretched between the four rotating bodies 180 so that a part of the shielding member 130 faces the slit hole 150 and shields the slit hole 150. As shown in FIGS. 8A to 8C, the slider 120 moves within the slit hole 150, the shielding member 130 moves together with the slider 120 in the movement direction of the slider 120 (rotates around the rotating body 180) in a state where the position of the entire shielding member 130 with respect to the slit hole 150 remains unchanged, the rotating body 180 rotates in conjunction with the movement of the shielding member 130, and the shielding member 130 keeps the slit hole 150 shielded.

Specifically, as shown in FIGS. 8A to 8C, the slider 120 moves in the direction indicated by the arrow b1 within the slit hole 150 to the second position P2, and the shielding member 130 also moves together with the slider 120 in the direction indicated by the arrow b11 and keeps the slit hole 150 shielded, the direction indicated by the arrow b1 being a direction from the first position P1 to the second position P2. Although not shown, when the slider 120 moves within the slit hole 150 from the second position P2 toward the first position P1 to the first position P1, the shielding member 130 also moves in the same direction and keeps the slit hole 150 shielded. This prevents a foreign matter (e.g., dust, dirt, etc.) from entering the battery stand 100.

Figure 9:
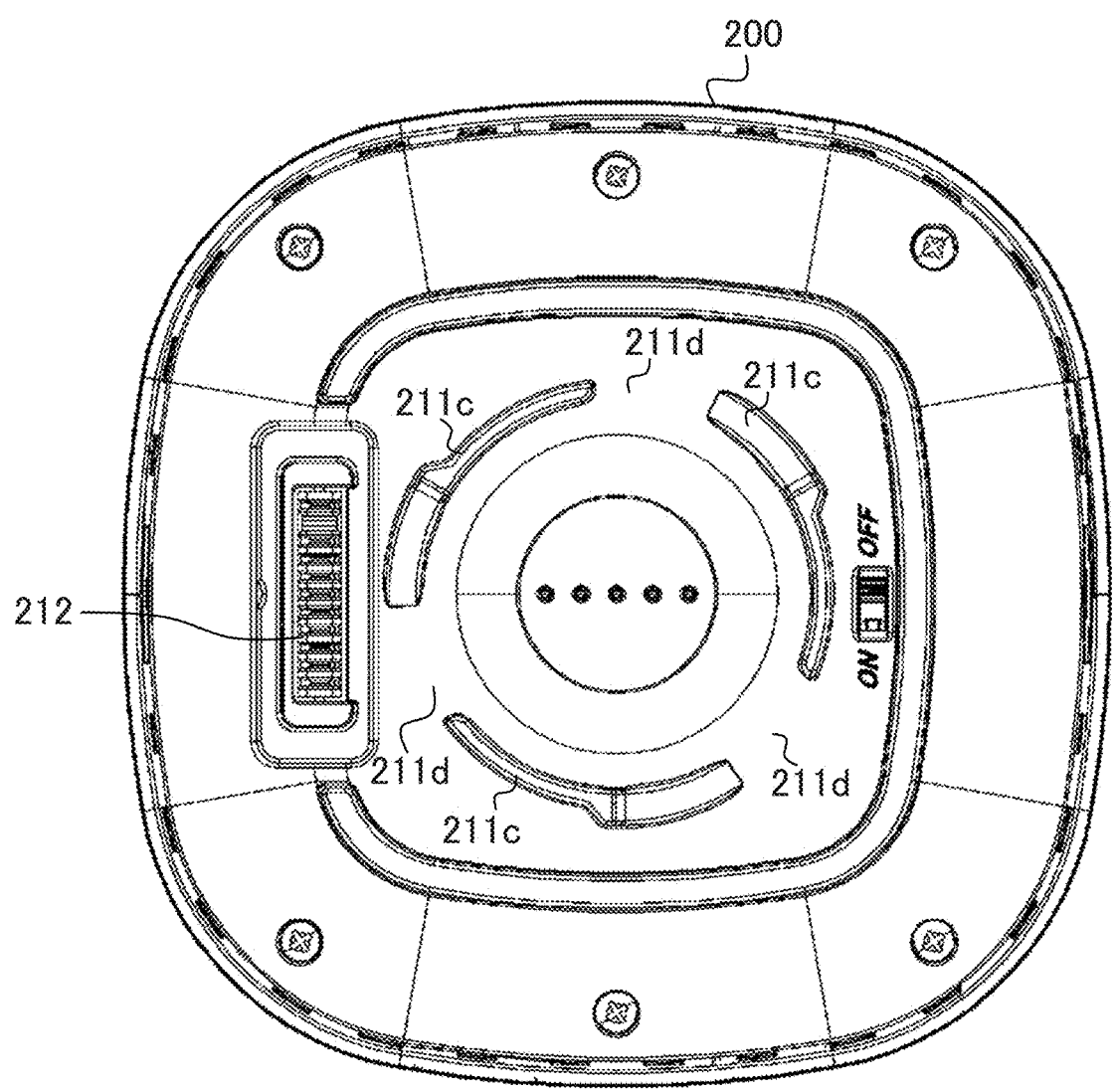
FIG. 9 shows an example of a configuration of the bottom of a battery.

As shown in FIG. 9, on the bottom surface of the battery 200, three engagement parts 211c are formed with gaps 211d. The bottom surface of the battery 200 is provided with a terminal 212. The terminal 212 is connected (electrically connected) to the terminal 170 of the battery stand 100. The terminal 212 may also be referred to as the "battery terminal" for convenience.

When the battery 200 is fixed on the battery stand 100, first, the battery 200 is arranged in first state on the holding part 161 of the holding mechanism 160 when the slider 120 is at the first position P1 shown in FIG. 3, etc.

In the first state, each of the three engagement parts 161c of the battery 200 is positioned in each of the three gaps 161d of the holding part 161 of the holding mechanism 160, and each of the three engagement parts 161c of the holding part 161 is positioned in each of the three gaps 211d of the battery 200.

In this first state, when the slider 120 is moved from the first position P1 to the second position P2, the holding part 161 of the holding mechanism 161 of the battery stand 100 rotates, and the engagement part 161c of the battery stand 100 moves in a rotational direction (counterclockwise) to which the engagement part 161c engages the engagement part 211c of the battery 200.

Then, when the slider 120 moves to the second position P2 and the engagement part 161c of the battery stand 100 and the engagement part 211c of the battery 200 are engaged, the battery 200 is secured to the holding part 161 of the holding mechanism 160. It should be noted that in the first state, the terminal 170 of the battery stand 100 is not connected to the terminal 170 of the battery stand 100, and the terminal 212 of the battery 200 and the terminal 170 of the battery stand 100 are connected when the slider 120 moves to the second position P2.

With the battery 200 secured to the holding part 161, the direct current (DC power) supplied from the battery 200 is converted to an alternating current (AC power) and the alternating current (AC power) can be supplied to the electronic device 1000 via the cable 1010 with AC plug connected to the AC outlet 140.

Figure 10:
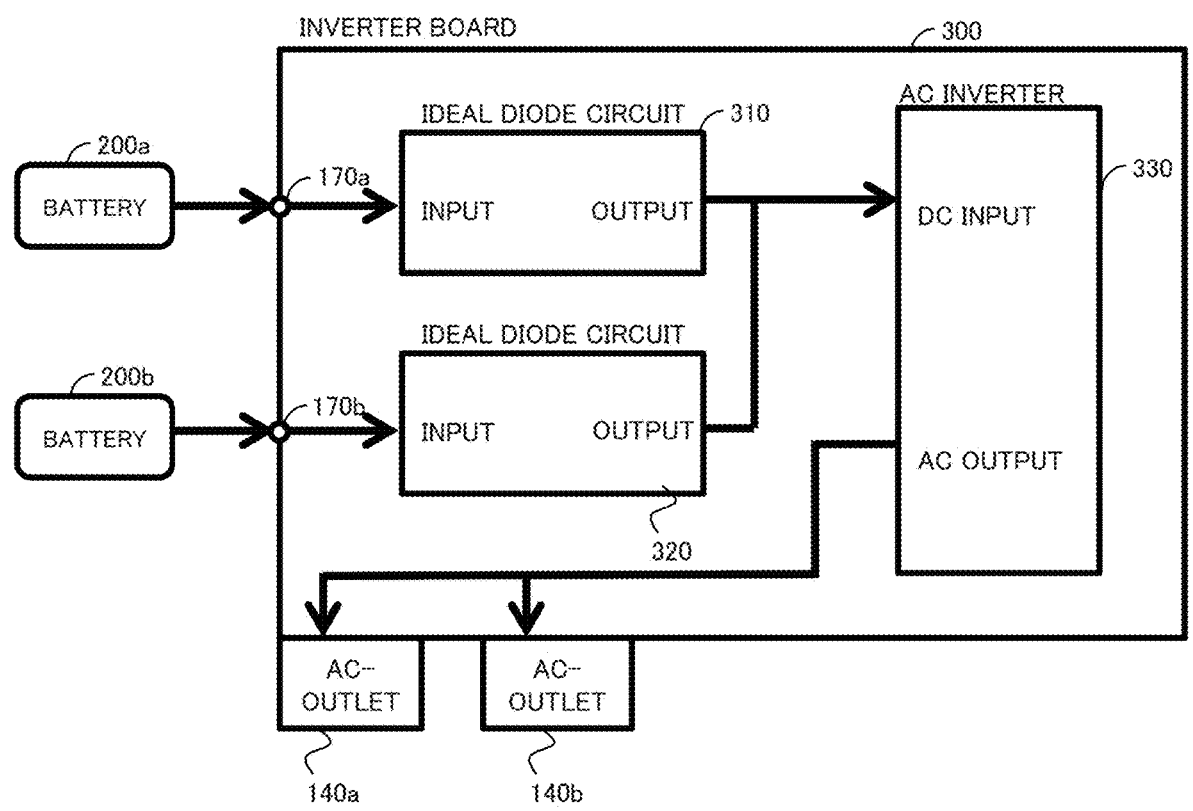
FIG. 10 is a block diagram to illustrate the function of an inverter board.

The battery stand 100 incorporates an inverter board 300 shown in FIG. 10, which contains the circuitry as a power conversion section (a power converter) for converting the direct current supplied by the battery 200 to the alternating current. FIG. 10 shows a block diagram to illustrate the function of the inverter board 300.

As shown in FIG. 10, the inverter board 300 consists of the first terminal 170a, the second terminal 170b, a first ideal diode circuit 310, a second ideal diode circuit 320, and an AC inverter 330. The first terminal 170a is a terminal for connecting to the battery terminal of the first battery 200a. The second terminal 170b is a terminal for connecting to the battery terminal of the second battery 200b. The direct current output (supplied) from the first battery 200a is input to and output from the first ideal diode circuit 310. The direct current output (supplied) from the second battery 200b is input to and output from the second ideal diode circuit 320.

The direct current output from each of the first ideal diode circuit 310 and the second ideal diode circuit 320 is input to the AC inverter 330. The AC inverter 330 converts the input direct current into the alternating current and outputs it to the first outlet 140a and the second outlet 140b.

<Effect>

As explained above, the battery stand 100 according to the embodiment of the present invention can prevent the foreign matter from entering the interior of the battery stand 100.

Figure 11:
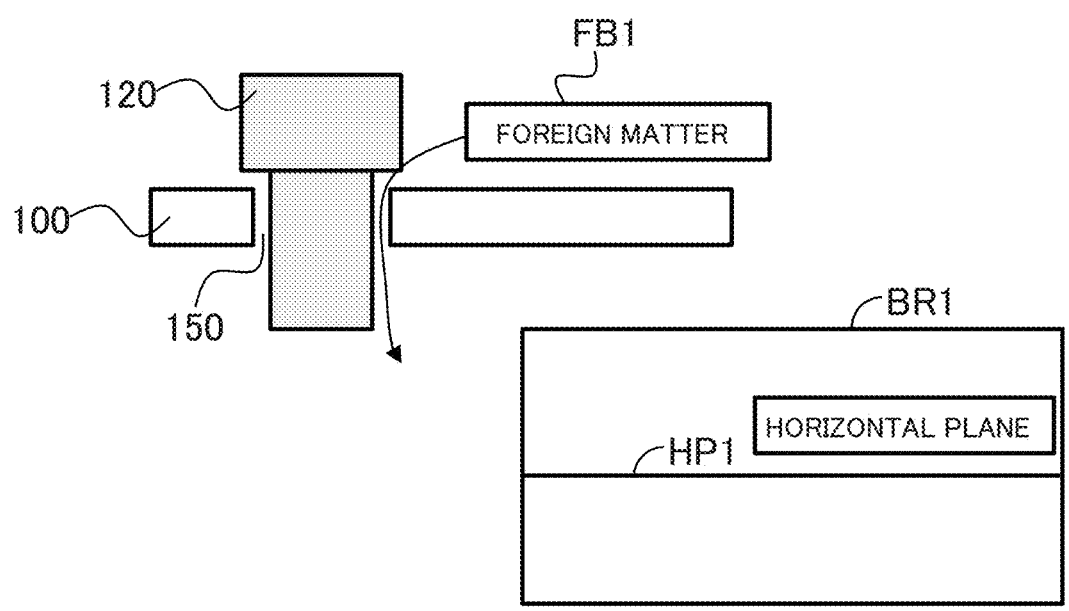
FIG. 11 illustrates an effect of the embodiment.
Figure 12:
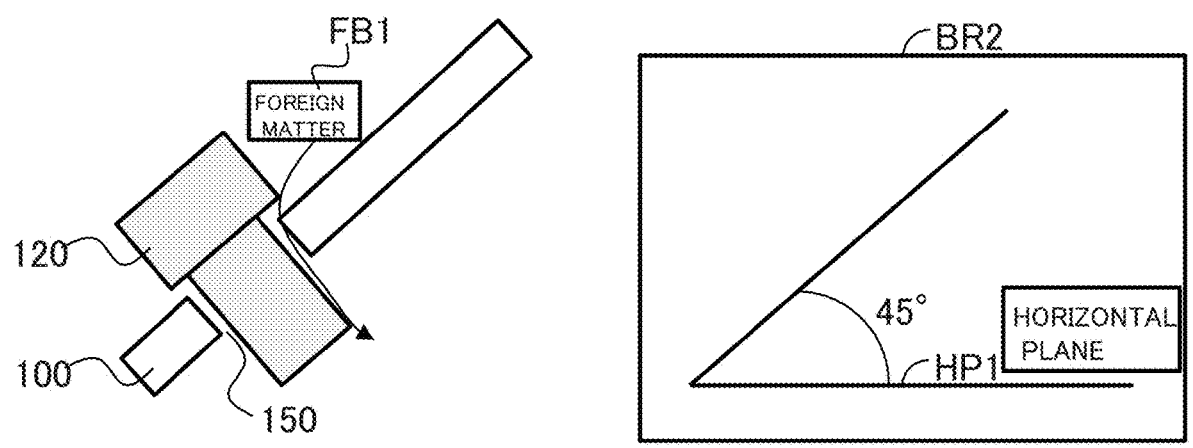
FIG. 12 illustrates the effect of the embodiment.

It should be noted that if the top surface of the battery stand 100 in which the slit hole 150 is formed is a surface formed so as to be 0 degrees or more and 90 degrees or less with respect to the horizontal plane, a foreign matter FB1 can easily enter through the slit hole 150. For example, as shown in FIG. 11, in this embodiment, the top surface of the battery stand 100 in which the slit hole 150 is formed is a surface formed so that the angle with respect to a horizontal plane HP1 is 0 degrees. In the battery stand 100 with the slit hole 150 formed in such the top surface, the foreign matter FB1 can easily penetrate into the interior of the battery stand 100 through the slit hole 150. Furthermore, as shown in FIG. 12, the top surface of the battery stand 100, in which the slit hole 150 is formed, is at an angle of 45 degrees with respect to the horizontal plane HP1 shown in a block BR2. With the battery stand 100 having the slit hole 150 formed in such a top surface, the foreign matter FB1 can easily penetrate.

Thus, the top surface of the battery stand 100 in which the slit hole 150 is formed is the surface formed so as to be 0 degrees or more and 90 degrees or less with respect to the horizontal plane HP1. Therefore, even if the foreign matter can easily penetrate through the slit hole 150, the slit hole 150 is shielded by the shielding member 130 in this embodiment and thereby, the foreign matter can be prevented from entering the battery stand 100.

First Modified Example

Figure 13:
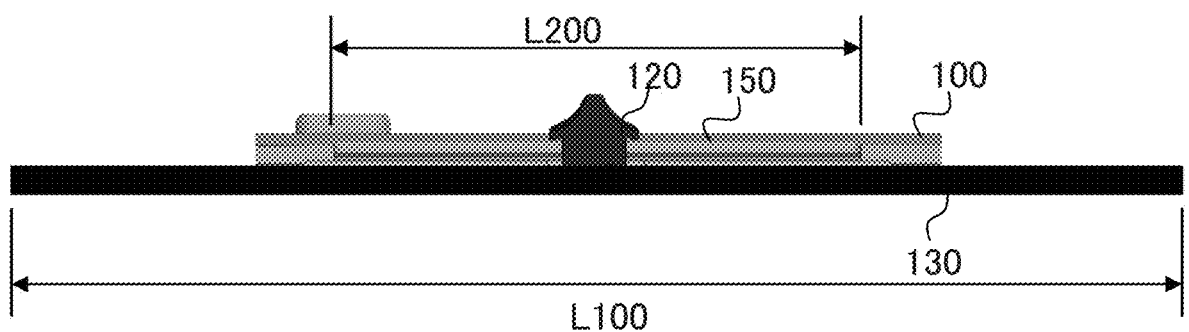
FIG. 13 illustrates the shielding member of a first modified example.

In the above embodiment, the shielding member 130 needs only be a member that moves with the slider 120 in the direction of movement of the slider 120 when the slider 120 moves within the slit hole 150 and keeps the slit hole 150 shielded. For example, the shielding member 130 may be band-shaped and straight, as shown in FIG. 13. The shielding member 130 is band-shaped and straight, and its width is greater than the width of the slit hole 150. From the viewpoint of easily shielding the slit hole 150, the shield member 130 preferably has a longitudinal length L100 that is at least twice the length L200 of the slit hole in the longitudinal direction. In the first modified example, when the slider 120 moves within the slit hole 150, the shielding member 130 also moves (slides (moves as a whole)) with the slider 120 in the direction of movement of the slider 120 and maintains the slit hole 150 in the shielded state. This can prevent the foreign matter 100 from entering the battery stand 100.

Second Modified Example

Figure 14:
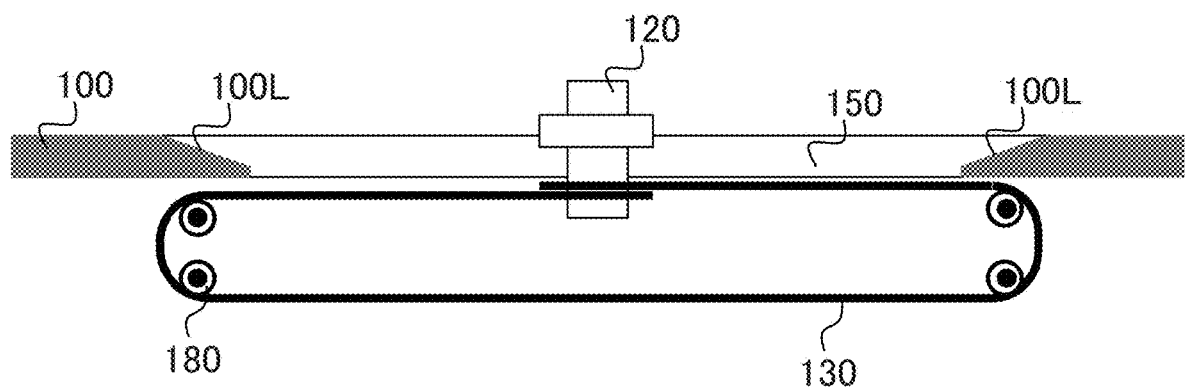
FIG. 14 illustrates a second modified example.
Figure 15A:
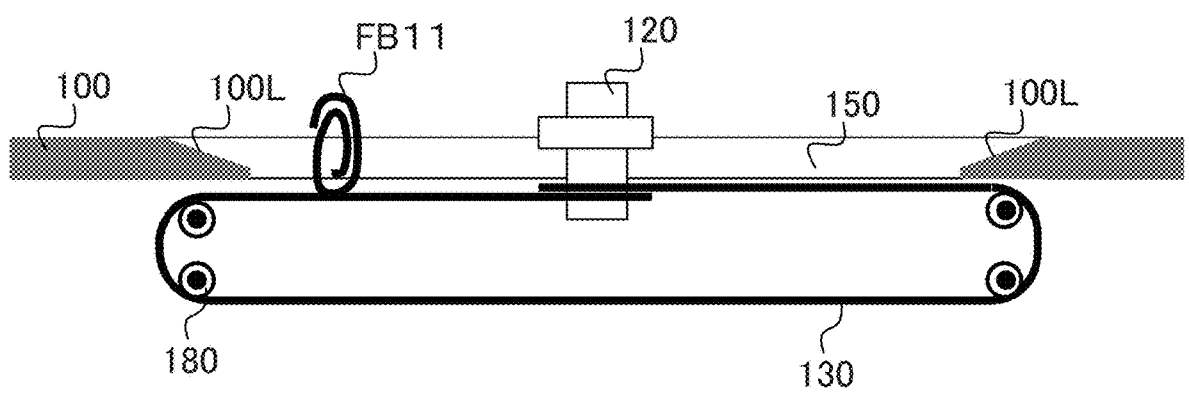
FIG. 15A illustrates the second modified example.
Figure 15B:
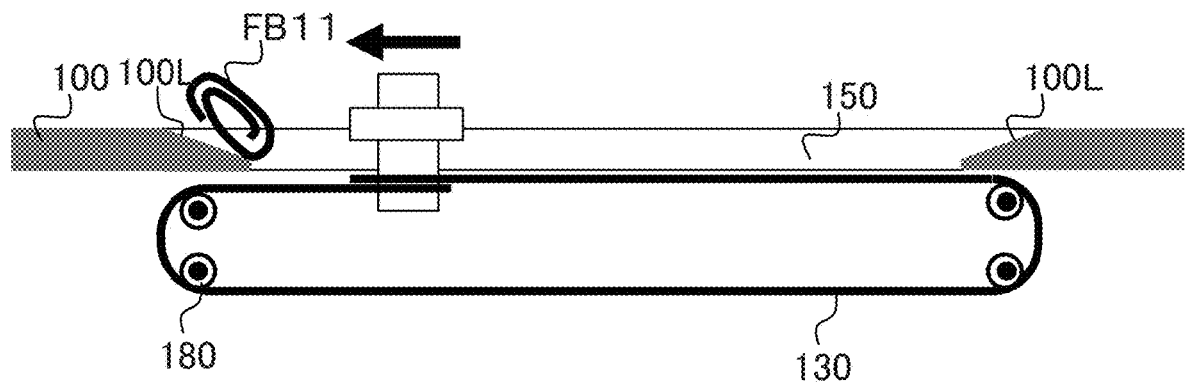
FIG. 15B illustrates the second modified example.

In the above embodiment, at least a portion of a hole forming surface of the slit hole 150 may be configured to be inclined. This can make it easier for the foreign matter on the shielding member 130 exposed through the slit hole 150 to be discharged to the outside. An example of the second modified example will be described below. As shown in FIG. 14, both hole forming surfaces 100L of the ends of the slit hole 150 in the longitudinal direction are configured to be inclined. In this second modified example, since the hole forming surfaces 100L are inclined, as shown in FIG. 15A, when a clip FB11 rides on the shielding member 130 exposed through the slit hole 150, as shown in FIG. 15B, the shielding member 130 is moved, and thereby, the clip FB11 can be easily ejected out of the slit hole 150.

Other Modified Example

The present invention is not limited to the above embodiments and variations, and various variations may be employed within the scope of the present invention. In the above embodiment and each of the modified examples, the battery stand 100 may further have an input terminal and, instead of the above circuit, may include a circuit as a power conversion section (a power converter) to convert AC power input from the input terminal to DC power and output it to the battery 200 via the terminal 170. In this case, the battery stand 100 is used together with the battery 200, and the battery stand 100 functions as a power supply (charging device) that can output (supply) the electric power to the battery 200 to charge the battery 200 when the battery 200 is placed on the battery stand 100.

In the above embodiments and each of the modified examples, the battery stand 100 may further include an input terminal, and a circuit as a power conversion section (a power converter) for converting AC power input from the input terminal into DC power and outputting it to the battery 200 via the terminal 170, the circuit including the above circuit. In this case, the battery stand 100 is used together with the battery 200, and when the battery 200 is placed, the battery stand 100 functions as a power supply device capable of outputting the electric power stored in the battery 200 and also functions as a power supply device (charging device) capable of supplying power to the battery 200 for charging.

Figure 16:
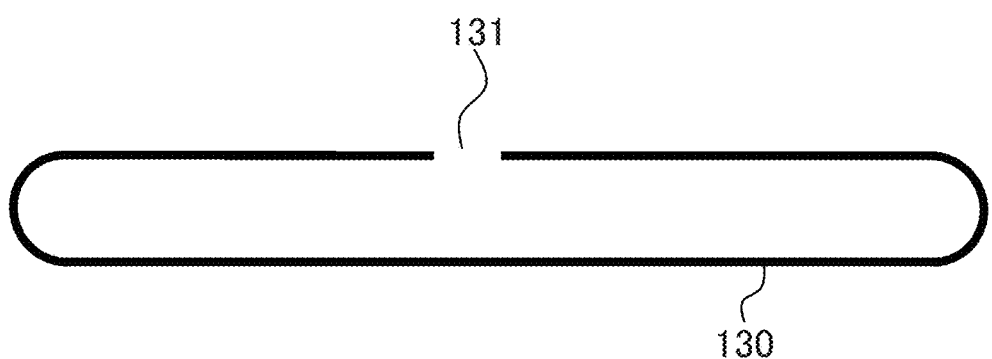
FIG. 16 shows a cross-sectional view of the shielding member of the other modified example.

In the above embodiment, the rotating body 180 is not limited to a pulley member, but can be any member that rotatably supports the shielding member 130. The rotating body 180 may also be referred to as a "folded part" for convenience. In the above embodiment, as shown in the cross-sectional view of the shielding member 130 in FIG. 16, the shielding member 130 may be a member in which the mounting hole 131 for mounting the slider 120 is formed in a seamless strip-shaped annular single member. For example, in the above embodiment and each of the modified examples, the number of battery mounting parts is not limited, for example, the number of battery mounting parts may be one or three or more. For example, in the above embodiment and each of the modified examples, the number of outlets and installation locations are not limited to the above.

What is claimed is:

1. A battery stand capable of outputting an electric power stored in a battery when the battery is placed on the battery stand, the battery stand comprising:
   a mounting part on which the battery is mounted;
   a conductive part that is provided on the mounting part and is electrically connectable to a battery terminal part of the battery;
   an output part that outputs an electric power input from the battery via the conductive part;
   a slider that moves between a first position and a second position; a holding mechanism that:
     interlocks with movement of the slider and secures, when the slider is positioned at the second position, the battery placed on the mounting part in a state where the battery terminal part is connected to the conductive part; and
     releases fixation of the battery when the slider is positioned at the first position;
   a top surface having a slit hole through which the slider is inserted and which regulates a range of the movement of the slider; and
   a shielding member that shields the slit hole,
   wherein,
   the shielding member is attached to the slider and moves with the movement of the slider while maintaining the slit hole shielded.

2. The battery stand according to claim 1, further comprising a power conversion part capable of converting DC power and outputting AC power,
   wherein,
   the power conversion part converts the DC power as the electric power input from the battery via the conduction part into the AC power and outputs it to the output part.

3. The battery stand according to claim 1, further comprising folded parts located inside the battery stand, outside of one end of the slit hole in a longitudinal direction, and outside of the other end of the slit hole in the longitudinal direction, respectively,
   wherein,
   the shielding member is an annular member stretched between the folded parts, and a part of the shielding member is positioned opposite the slit hole and rotates around the folded parts in conjunction with the movement of the slider.

4. The battery stand according to claim 3,
   wherein,
   a maximum diameter of the shielding member along the longitudinal direction of the slit hole is greater than or equal to a length in the longitudinal direction of the slit hole.

5. The battery stand according to claim 3,
   wherein,
   the folded part is a rotating body on which the shielding member is hung and rotates in conjunction with the movement of the shielding member.

6. The battery stand according to claim 1,
   wherein,
   the slit hole is formed on a surface whose angle to a horizontal plane is between 0 and 90 degrees.

7. The battery stand according to claim 1,
   wherein,
   at least a part of a hole forming surface of the slit hole is inclined.

8. The battery stand according to claim 1,
   wherein,
   the shielding member is a band-shaped member with a first hole at one end and a second hole at the other end, the band-shaped member bending into an annular shape and has a mounting hole to which the slider is attached, the mounting hole being formed by overlapping the first hole and the second hole.

9. The battery stand according to claim 1,
   wherein,
   the shielding member is a single, seamless, band-shaped, and annular member with a mounting hole to which the slider is attached.

10. The battery stand according to claim 1,
    wherein,
    the shielding member is a band-shaped and straight member that slides along a longitudinal direction of the slit hole in conjunction with the movement of the slider.

11. The battery stand according to claim 1,
    wherein,
    a length of the shielding member is at least twice a length in a longitudinal direction of the slit hole.

12. A battery stand capable of charging a battery when the battery is placed on the battery stand, the battery stand comprising:
    a mounting part on which the battery is mounted;
    a conductive part that is provided on the mounting part and is electrically connectable to a battery terminal part of the battery;
    an input part that inputs an electric power input to the battery via the conductive part;
    a slider that moves between a first position and a second position;
    a holding mechanism that:
      interlocks with movement of the slider and secures, when the slider is positioned at the second position, the battery placed on the mounting part in a state where the battery terminal part is connected to the conductive part; and
      releases fixation of the battery when the slider is positioned at the first position;
    a top surface having a slit hole through which the slider is inserted and which regulates a range of the movement of the slider; and
    a shielding member that shields the slit hole,
    wherein,
    the shielding member is attached to the slider and moves with the movement of the slider while maintaining the slit hole shielded.

13. A battery stand capable of outputting an electric power stored in a battery and charging the battery when the battery is placed on the battery stand, the battery stand comprising:
    a mounting part on which the battery is mounted;

a conductive part that is provided on the mounting part and is electrically connectable to a battery terminal part of the battery;

an output part that outputs an electric power input from the battery via the conductive part;

an input part that inputs the electric power input to the battery from the outside via the conductive part;

a slider that moves between a first position and a second position;

a holding mechanism that:
  interlocks with movement of the slider and secures, when the slider is positioned at the second position, the battery placed on the mounting part in a state where the battery terminal part is connected to the conductive part; and
  releases fixation of the battery when the slider is positioned at the first position;

a top surface having a slit hole through which the slider is inserted and which regulates a range of the movement of the slider; and a shielding member that shields the slit hole, wherein, the shielding member is attached to the slider and moves with the movement of the slider while maintaining the slit hole shielded.

\* \* \* \* \*